United States Patent
Takeno et al.

(10) Patent No.: US 12,332,624 B2
(45) Date of Patent: Jun. 17, 2025

(54) PROCESS CONTROL SYSTEM, PROCESS CONTROL APPARATUS, AND PROGRAM UPDATE METHOD

(71) Applicant: Yokogawa Electric Corporation, Musashino (JP)

(72) Inventors: Yusuke Takeno, Musashino (JP); Takeshi Ohno, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 636 days.

(21) Appl. No.: 17/705,657

(22) Filed: Mar. 28, 2022

(65) Prior Publication Data

US 2022/0317645 A1 Oct. 6, 2022

(30) Foreign Application Priority Data

Mar. 30, 2021 (JP) .................. 2021-056490

(51) Int. Cl.
G05B 19/042 (2006.01)

(52) U.S. Cl.
CPC .. *G05B 19/0426* (2013.01); *G05B 2219/2214* (2013.01)

(58) Field of Classification Search
CPC ........ G05B 19/0426; G05B 2219/2214; G05B 9/03; G05B 19/4185; G05B 2219/31088; G05B 19/042; G05B 19/41; G05B 19/418; G06F 8/65
See application file for complete search history.

(56) References Cited

U.S. PATENT DOCUMENTS

| | | | | |
|---|---|---|---|---|
| 2009/0125122 A1* | 5/2009 | Cook | ............. | G05B 19/058 700/9 |
| 2009/0198862 A1* | 8/2009 | Okitsu | ............. | G06F 9/5088 710/316 |
| 2013/0097458 A1* | 4/2013 | Sekino | ............. | G06F 11/1441 714/E11.138 |

(Continued)

FOREIGN PATENT DOCUMENTS

| | | |
|---|---|---|
| EP | 3629111 A2 | 4/2020 |
| JP | H07-219800 A | 8/1995 |

(Continued)

OTHER PUBLICATIONS

Office Action dated Jan. 7, 2025, issued in counterpart JP application No. 2022-056995, with English translation. (8 pages).

(Continued)

*Primary Examiner* — Tonia L Dollinger
*Assistant Examiner* — Mehulkumar J Shah
(74) *Attorney, Agent, or Firm* — WHDA, LLP

(57) ABSTRACT

A process control system includes a first process control apparatus and a second process control apparatus. The second process control apparatus includes a data takeover unit configured to acquire, from the first process control apparatus, takeover data required to be taken over to continue a system function when switching from the first process control apparatus to the second process control apparatus is performed and restore the takeover data in the second process control apparatus and a timing determiner configured to determine a timing when the switching will be performed.

15 Claims, 10 Drawing Sheets

(56) References Cited

U.S. PATENT DOCUMENTS

| | | | |
|---|---|---|---|
| 2014/0379134 A1* | 12/2014 | Tsuchiya | G06F 9/45558 |
| | | | 700/275 |
| 2015/0032229 A1* | 1/2015 | Ohno | G05B 15/02 |
| | | | 700/12 |
| 2015/0205280 A1 | 7/2015 | Tsuchiya et al. | |
| 2016/0291958 A1* | 10/2016 | Riedisser | G06F 8/71 |
| 2020/0097282 A1* | 3/2020 | Ohno | G06F 8/658 |
| 2022/0261237 A1* | 8/2022 | Dreesen | G06F 8/434 |

FOREIGN PATENT DOCUMENTS

| | | |
|---|---|---|
| JP | 2015-138292 A | 7/2015 |
| JP | 2020-52668 A | 4/2020 |

OTHER PUBLICATIONS

Office Action dated Dec. 10, 2024, issued in CN Application No. 202210318987.6, with English translation. (21 pages).

\* cited by examiner

| VARIABLE | ADDRESS BEFORE SWITCHING | ADDRESS AFTER SWITCHING |
|---|---|---|
| a | 0xa000+0x0000 | 0xc000+0x0000 |
| b | 0xa000+0x0004 | 0xc000+0x0004 |
| b.b1 | 0xa000+0x0004 | 0xc000+0x0004 |
| b.b2 | 0xa000+0x0008 | 0xc000+0x0008 |
| c[] | 0xa000+0x000c | 0xc000+0x000c |
| c[0] | 0xa000+0x000c | 0xc000+0x000c |
| c[1] | 0xa000+0x0010 | 0xc000+0x0010 |
| c[2] | 0xa000+0x0014 | 0xc000+0x0014 |
| c[3] | 0xa000+0x0018 | 0xc000+0x0018 |
| c[4] | 0xa000+0x001c | 0xc000+0x001c |
| c[5] | 0xa000+0x0020 | 0xc000+0x0020 |
| p_a | 0xa000+0x0024 | 0xc000+0x0024 |
| p_b | 0xa000+0x0028 | 0xc000+0x0028 |
| p_c | 0xa000+0x002c | 0xc000+0x002c |

FIG. 7B

```
int a;
struct {
  int b1;
  int b2;
} b;
int c[6];
int *p_a;/* POINTER FOR VARIABLE a */
int *p_b;/* POINTER FOR MEMBER b2 OF STRUCTURE VARIABLE b */
int *p_c;/* POINTER FOR 2ND ELEMENT OF ARRAY VARIABLE c */
```

| VARIABLE | ADDRESS BEFORE SWITCHING | ADDRESS AFTER SWITCHING |
|---|---|---|
| a | 0xa000+0x0000 | 0xc000+0x0000 |
| b | 0xa000+0x0004 | 0xc000+0x0004 |
| b.b1 | 0xa000+0x0004 | 0xc000+0x0004 |
| b.b2 | 0xa000+0x0008 | 0xc000+0x0008 |
| b.b3 | – (ABSENT) | 0xc000+0x000c |
| b.b4 | – (ABSENT) | 0xc000+0x0010 |
| c[] | 0xa000+0x000c | 0xc000+0x0014 |
| c[0] | 0xa000+0x000c | 0xc000+0x0014 |
| c[1] | 0xa000+0x0010 | 0xc000+0x0018 |
| c[2] | 0xa000+0x0014 | 0xc000+0x001c |
| c[3] | 0xa000+0x0018 | 0xc000+0x0020 |
| c[4] | 0xa000+0x001c | – (ABSENT) |
| c[5] | 0xa000+0x0020 | – (ABSENT) |
| p_a | 0xa000+0x0024 | 0xc000+0x0024 |
| p_b | 0xa000+0x0028 | 0xc000+0x0028 |
| p_c | 0xa000+0x002c | 0xc000+0x002c |

FIG. 9B

```
int a;
struct {
  int b1;
  int b2;
  int b3;
  int b4;
} b;
int c[4];
int *p_a;/* POINTER FOR VARIABLE a */
int *p_b;/* POINTER FOR MEMBER b2 OF STRUCTURE VARIABLE b */
int *p_c;/* POINTER FOR 2ND ELEMENT OF ARRAY VARIABLE c */
```

PROCESS CONTROL SYSTEM, PROCESS CONTROL APPARATUS, AND PROGRAM UPDATE METHOD

BACKGROUND OF THE INVENTION

Field of the Invention

The present invention relates to a process control system, a process control apparatus, and a program update method.

The present application claims priority based on Japanese patent application 2021-056490, filed on Mar. 30, 2021 and includes herein by reference the content thereof.

Description of Related Art

In the related art, in plants, factories, and the like (hereinafter simply referred to as "plants" when these are collectively referred to), a process control system that controls various types of state quantities (for example, a pressure, a temperature, a flow rate, and the like) in an industrial process has been constructed and an advanced automated operation has been implemented.

This process control system may require the replacement of hardware or the improvement of software. Furthermore, examples of the improvement of software include an extension of a function of an operating system (OS), the correction of a malfunction or vulnerability of the operating system, and the like.

In Japanese Unexamined Patent Application Publication No. 2020-52668 (hereinafter, referred to as Patent Document 1), an invention in which it is possible to update an update target program easily for a short period of time while continuously operating a process control system in the process control system including a redundant process control apparatus (an active apparatus and an update apparatus) has been disclosed. Specifically, in the active apparatus, a non-update target program, which is not an update target, is temporarily stopped and only the context of the non-update target program is transferred from the active apparatus to the update apparatus. The update apparatus restores the context of the non-update target program using the transferred context, the context of the update target program is initialized, and the non-update target program and the update target program are restarted in the update apparatus.

SUMMARY OF THE INVENTION

It is necessary to embed a function required to implement online system update (hereinafter referred to as an "online update function") into both the active apparatus and the update apparatus so that the system program is updated according to the invention disclosed in Patent Document 1. The "online system update" is a mechanism of updating the system program while continuing an execution of a function (a system function) implemented by the system program.

However, although the above-mentioned online update function can be easily embedded into the update apparatus in the standby state, it is difficult to embed the online update function into the active apparatus in the operating state. Thus, there is a problem that the active apparatus is required to be stopped at least once to embed the above-mentioned online update function into the active apparatus.

One aspect of the present invention provides a process control system, a process control apparatus, and a program update method capable of implementing a function extension of online system update without stopping a process control system.

A process control system (1) according to one aspect of the present invention may include a first process control apparatus (10) and a second process control apparatus (20), wherein the second process control apparatus includes a data takeover unit (24b) configured to acquire, from the first process control apparatus, takeover data (DT) which is required to be taken over to continue a system function, when switching from the first process control apparatus to the second process control apparatus is performed and restore the takeover data in the second process control apparatus; and a timing determiner (24c or 24f) configured to determine a timing when the switching will be performed.

According to the present invention, there is an advantageous effect that a function extension of online system update can be implemented without stopping a process control system.

BRIEF DESCRIPTION OF THE DRAWINGS

FIG. 7A is a diagram showing an example of an address conversion table according to the second embodiment of the present invention.

FIG. 7B is a diagram showing an example of external variables.

FIG. 9A is a diagram showing an example of a modified address conversion table in the second embodiment of the present invention.

FIG. 9B is a diagram showing another example of external variables.

DETAILED DESCRIPTION OF THE INVENTION

Figure 1:
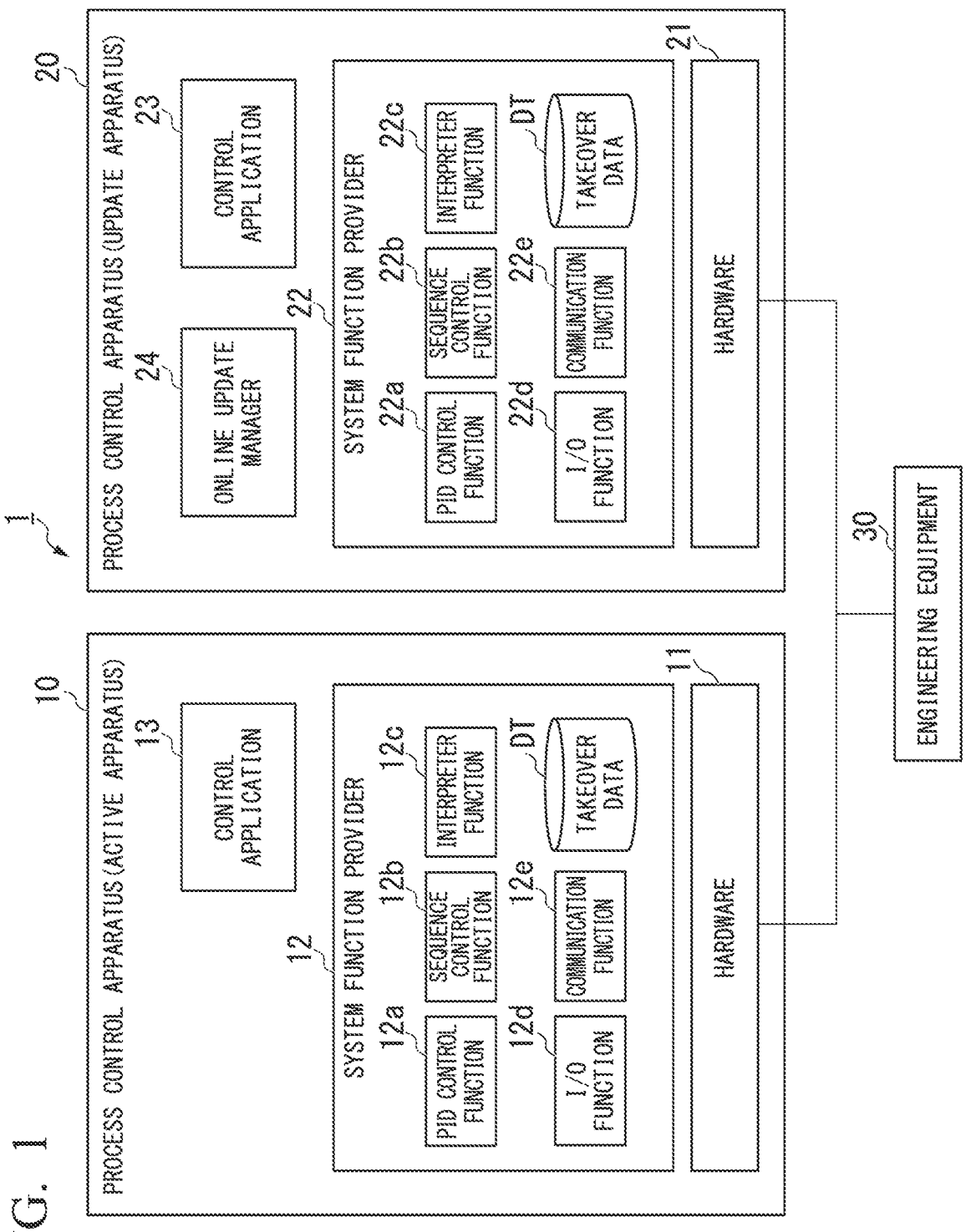
FIG. 1 is a functional configuration diagram showing a schematic functional configuration of a process control system according to a first embodiment of the present invention.

Hereinafter, a process control system, a process control apparatus, and a program update method according to embodiments of the present invention will be described in detail with reference to the drawings. Hereinafter, an overview of an embodiment of the present invention will be described first and then details of each embodiment will be described.

[Overview]

The embodiment of the present invention is to implement a function extension of online system update without stopping the process control system. Because the process control system is normally required to operate continuously for a long period of time from a month to a year to improve production efficiency as much as possible, it is difficult to freely stop the process control system in the operating state. For example, stopping the process control system is not basically allowed except for the stoppage due to the regular maintenance or a shutdown that is performed to ensure the safety of the plant. This is because, for example, in the case of a chemical process, if an unexpected interruption occurs during a process of continuing a chemical reaction, a semi-finished product produced halfway may become unusable and cause significant damage.

On the other hand, because the prevention of erroneous operations and loss of operations is required in the process control system from the viewpoint of safety, it is necessary to take immediate action (a mechanism of updating the operating system) that can eliminate the cause when a cause of an erroneous operation or the like (for example, a malfunction or vulnerability in the operating system) has been found. However, as described above, because the process control system cannot be stopped freely, even if a cause of an erroneous operation or the like is found, it may be difficult to immediately deal with the cause.

Using the invention disclosed in Patent Document 1 described above, it is possible to update the system program (online system update) while continuing the execution of the function (the system function) implemented by the system program. However, it is necessary to embed the online update function necessary for implementing the online system update into both the active apparatus and the update apparatus so that the system program is updated according to the invention disclosed in Patent Document 1 described above.

However, although the above-mentioned online update function enables the extension function to be easily embedded into the update apparatus in a standby state, it is difficult to embed the extension function into the active apparatus in the operating state. In other words, this indicates that, even if the extension function of the online update is implemented in the active apparatus, it would be difficult to use the extension function at the next online update time. For example, although a specific system function has a restriction that an execution is stopped at the online update time in the related art, the execution can be continued according to the extension function of the online update. In this case, the conventional online update should be used at least once to embed the extension into the conventional online update function of the active apparatus. Therefore, a specific system function must be stopped when using traditional online updating.

In the embodiment of the present invention, an update apparatus (a second process control apparatus) acquires data (takeover data) required to be taken over so that a system function is continued, from an active apparatus (a first process control apparatus) when switching from the active apparatus to the update apparatus is performed and restores the data (the takeover data) in the update apparatus. The update apparatus determines a timing when the switching from the active apparatus to the update apparatus will be performed. In the present embodiment, because it is only necessary to embed the online update function required for implementing the online system update into the update apparatus and it is unnecessary to embed the online update function into the active apparatus, it is possible to implement the function extension of the online system update without stopping the process control system.

First Embodiment

<Process Control System>

FIG. 1 is a functional configuration diagram showing a schematic functional configuration of a process control system according to a first embodiment of the present invention. As shown in FIG. 1, a process control system 1 of the present embodiment includes a process control apparatus 10 (a first process control apparatus), a process control apparatus 20 (a second process control apparatus), and engineering equipment 30. The process control apparatus 10 and the process control apparatus 20 are implemented using computers of the same or similar scale. In the present embodiment, the process control apparatus 10 may be referred to as an "active apparatus" and the process control apparatus 20 may be referred to as an "update apparatus."

The "active apparatus" is an apparatus currently being operated, and the "update apparatus" is an apparatus that is on standby so that a program is updated without currently being operated.

In the present embodiment, a function operating in the process control apparatus 10 is switched to the process control apparatus 20 so that the program is updated. That is, initially, the process control apparatus 10 that is the active apparatus is operating to control a process and the process control apparatus 20 that is the update apparatus is on standby. Subsequently, the function in the process control apparatus 10 (the active apparatus) is temporarily stopped on the basis of a command signal from the engineering equipment 30 and the function is restarted in the process control apparatus 20 (the update apparatus). Although details will be described below, the process control apparatus 20 has a function for updating the program while the system is in operation.

The process control apparatus 10 includes functions of hardware 11, a system function provider 12, and a control application 13. The hardware 11 includes a CPU (a Central Processing Unit), a memory, an input/output device, a communication device, and the like, and executes various types of programs (a system program for implementing a system function provided from the system function provider 12, an application program for implementing the control application 13, and the like) for use in the process control apparatus 10. The function of the process control apparatus 10 is implemented when the hardware 11 executes a program for implementing the function. That is, the function of the process control apparatus 10 is implemented by software and hardware resources in cooperation.

The system function provider 12 is located between the hardware 11 and the control application 13 and provides various types of system functions in response to a call from the control application 13 while managing the hardware 11. For example, the system function provider 12 provides system functions such as a PID control function 12a, a sequence control function 12b, an interpreter function 12c, an I/O function 12d, and a communication function 12e. The system function provider 12 also includes an operating system (OS) and a driver. The system program that implements various types of system functions provided by the system function provider 12 includes an update target program that can be an update target and a non-update target program that is not an update target.

The control application 13 executes process control in a prescribed control period (for example, a period of about several seconds). The control application 13 includes, for example, one or more control logics created by a user using the engineering equipment 30. The control application 13 executes process control while calling the system function provided by the system function provider 12. The switching from the process control apparatus 10 to the process control apparatus 20 is performed so that the operation of the control application 13 and the execution of the system function called from the control application 13 continue.

The process control apparatus 20 includes functions of hardware 21, a system function provider 22, a control application 23, and an online update manager 24. The hardware 21 is similar to the above hardware 11 and execute various types of programs for use in the process control apparatus 20 (a system program for implementing a system function provided from the system function provider 22, an application program for implementing the control application 23, and the like). The function of the process control apparatus 20 is also implemented by software and hardware resources in cooperation.

The system function provider 22 provides a system function similar to that of the system function provider 12 described above. Specifically, the system function provider 22 provides system functions such as a PID control function 22a, a sequence control function 22b, an interpreter function 22c, an I/O function 22d, and a communication function 22e. The system function provided from the system function provider 22 may be the same as the system function provided from the system function provider 12 and may include a different function (for example, an extended function).

The online update manager 24 controls an online system update mechanism of updating the system program while continuing the execution of the system function implemented by the system program. Specifically, the online update manager 24 acquires data (takeover data DT), which is required to be taken over so that the system function is continued, from the process control apparatus 10 when switching from the process control apparatus 10 to the process control apparatus 20 is performed and restores the data (the takeover data DT) in the process control apparatus 20. The online update manager 24 determines a timing when switching from the process control apparatus 10 to the process control apparatus 20 is performed. Details of the steps performed by the online update manager 24 will be described below.

The engineering equipment 30 performs various types of engineering in the process control system 1 using plant design information including design information of the process control system 1. The engineering equipment 30 issues a command for activating the process control apparatus 20 when switching from the process control apparatus 10 to the process control apparatus 20 is performed. The engineering equipment 30 is implemented by a computer, for example, such as a personal computer or a workstation.

Figure 2:
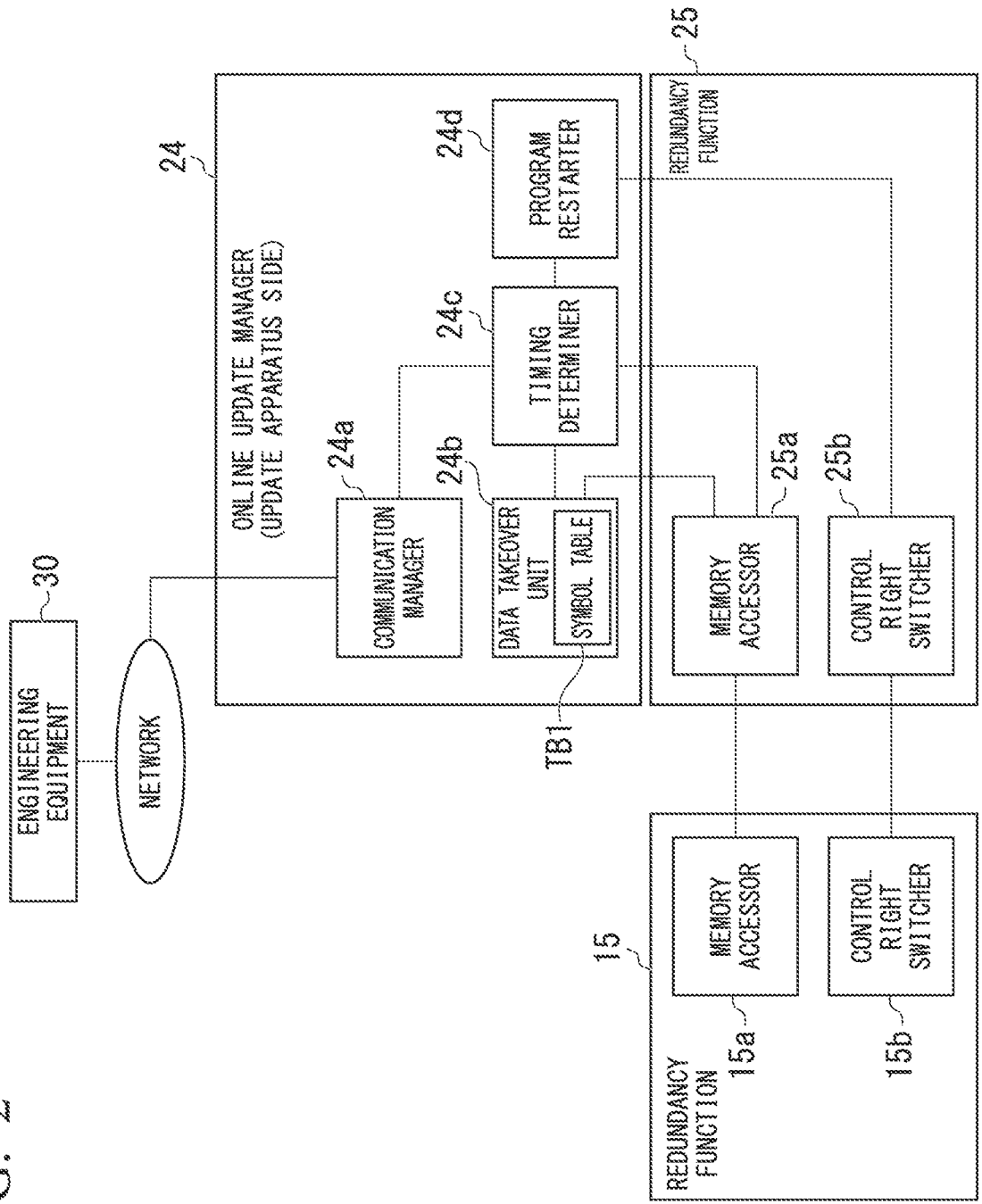
FIG. 2 is a functional block diagram showing a functional configuration in which online system update is implemented in the first embodiment of the present invention.

FIG. 2 is a functional block diagram showing a functional configuration in which online system update is implemented in the first embodiment of the present invention. In FIG. 2, a redundancy function 15 is a function provided on the active apparatus side (the process control apparatus 10 in FIG. 1) and a redundancy function 25 is a function provided on the update apparatus side (the process control apparatus 20 in FIG. 1). The online update manager 24 is a function provided on the update apparatus side (the process control apparatus 20 in FIG. 1).

The redundancy functions 15 and 25 are used to control process control apparatuses in the control and standby systems that are configured for redundancy, but can be used for some online system update functions in addition to redundancy applications. In both cases, the functions are realized by exchanges between the process control apparatuses 10 and 20, and the two apparatuses operate in cooperation with each other. The redundancy function 15 includes a memory accessor 15a and a control right switcher 15b and the redundancy function 25 includes a memory accessor 25a and a control right switcher 25b.

Memory accessor 15A and memory accessor 25A interact in the redundancy function to copy all memory of the control system apparatus to the memory of the standby system apparatus. On the other hand, in the online system update function, exchange is conducted to copy the takeover data DT (see FIG. 1) which is required to be taken over so that the system function is continued when switching from process control apparatus 10 to process control apparatus 20. The control right switcher 15B and the control right switcher 25B pass control signals (control right) to each other to switch from the control system apparatus to the standby system apparatus in the redundant function. On the other hand, in the online system update function, control signals (control rights) are sent to switch from the active apparatus 10 to the update apparatus 20. The functions of the redundancy functions 15 and 25 are implemented by software and hardware resources in cooperation.

As shown in FIG. 2, the online update manager 24 includes a communication manager 24a, a data takeover unit 24b, a timing determiner 24c, and a program restarter 24d. The process control apparatus 20 is connected to the engineering equipment 30 via a network. The communication manager 24a of the process control apparatus 20 may communicate with the engineering equipment 30 via the network.

The communication manager 24a receives a command (an activation command) transmitted from the engineering equipment 30 via the network. When the activation command has been received from the engineering equipment 30, the communication manager 24a makes an instruction for causing the timing determiner 24c to determine a timing (a switching timing) when the switching from the process control apparatus 10 to the process control apparatus 20 is performed.

When the switching timing has been determined by the timing determiner 24c, the data takeover unit 24b acquires the takeover data DT, which is required to be taken over so that the system function is continued, from the process control apparatus 10 and restores the takeover data DT in the process control apparatus 20. The data takeover unit 24b includes a symbol table TB1 of the system function in the process control apparatus 10 and acquires the takeover data DT from the process control apparatus 10 with reference to the symbol table TB1.

The above-described symbol table TB1 is a table generated by compiling and linking a system program (a source program) that implements a system function in the process control apparatus 10. It is possible to acquire an address where the takeover data DT is stored in the process control apparatus 10 by referring to this symbol table TB1. The data takeover unit 24b accesses the address obtained with reference to the symbol table TB1 and acquires the takeover data DT.

The data takeover unit 24b acquires an address where the takeover data DT should be stored in the process control apparatus 20 and restores the takeover data DT in the process control apparatus 20 by setting the acquired takeover data DT at the address. That is, the data takeover unit 24b restores the context of the system function whose process is continued in the process control apparatus 20 when the switching from the process control apparatus 10 to the process control apparatus 20 is performed.

The timing determiner 24c determines a timing of the switching from the process control apparatus 10 to the process control apparatus 20 on the basis of the instruction from the communication manager 24a. Specifically, the timing determiner 24c determines the switching timing so that the switching from the process control apparatus 10 to the process control apparatus 20 is performed after confirming a state in which executions of all system functions in the process control apparatus 10 are completed (hereinafter also referred to as a "completed state of the process control apparatus 10").

This is to perform the switching from the process control apparatus 10 to the process control apparatus 20 reliably. For example, when the system function is a function of outputting a control signal, a part of the output will be lost if the switching from the process control apparatus 10 to the process control apparatus 20 is performed before a control signal output is completed. To prevent such a situation from occurring, the timing determiner 24c determines the switching timing so that the switching from the process control apparatus 10 to the process control apparatus 20 is performed after confirming the completed state of the process control apparatus 10.

A timing at which the timing determiner 24c confirms the completed state of the process control apparatus 10 is between the end of a processing to be executed in a certain control period of the process control apparatus 10 and the start of the next control period and is a timing that is a prescribed period of time earlier than a point in time when the next control period starts.

The above-described prescribed period of time is a sum of a period of time required for the timing determiner 24c to confirm the completed state of the process control apparatus 10 and a period of time required for the data takeover unit 24b to acquire the takeover data DT from the process control apparatus 10 and restore the takeover data DT in the process control apparatus 20.

That is, the timing determiner 24c confirms the completed state of the process control apparatus 10 at a timing when a minimum period of time required for the switching from the process control apparatus 10 to the process control apparatus 20 is left before a point in time when the next control period starts. Confirming the completed state of the process control apparatus 10 at such a timing is to check to see if a period of time required to complete the execution of the system function in the process control apparatus 10 after the end of a processing to be executed in a certain control period of the process control apparatus 10 remains in the control period.

When the completed state of the process control apparatus 10 has been confirmed, the timing determiner 24c notifies the process control apparatus 10 of the switching timing. When it is difficult to confirm the completed state of the process control apparatus 10, the timing determiner 24c suspends the online system update. This is to prevent the online system update from being performed in a state in which the system function whose process is not completed is present.

After the timing determiner 24c notifies the process control apparatus 10 of the switching timing, the program restarter 24d waits for a control signal (control right) to be transmitted from the process control apparatus 10 via the redundancy functions 15 and 25. When the control signal (control right) is transmitted from the process control apparatus 10, the program restarter 24d restarts the program that implements the system function and causes the process control apparatus 20 to operate as the active apparatus.

<Program Update Method>

Figure 3:
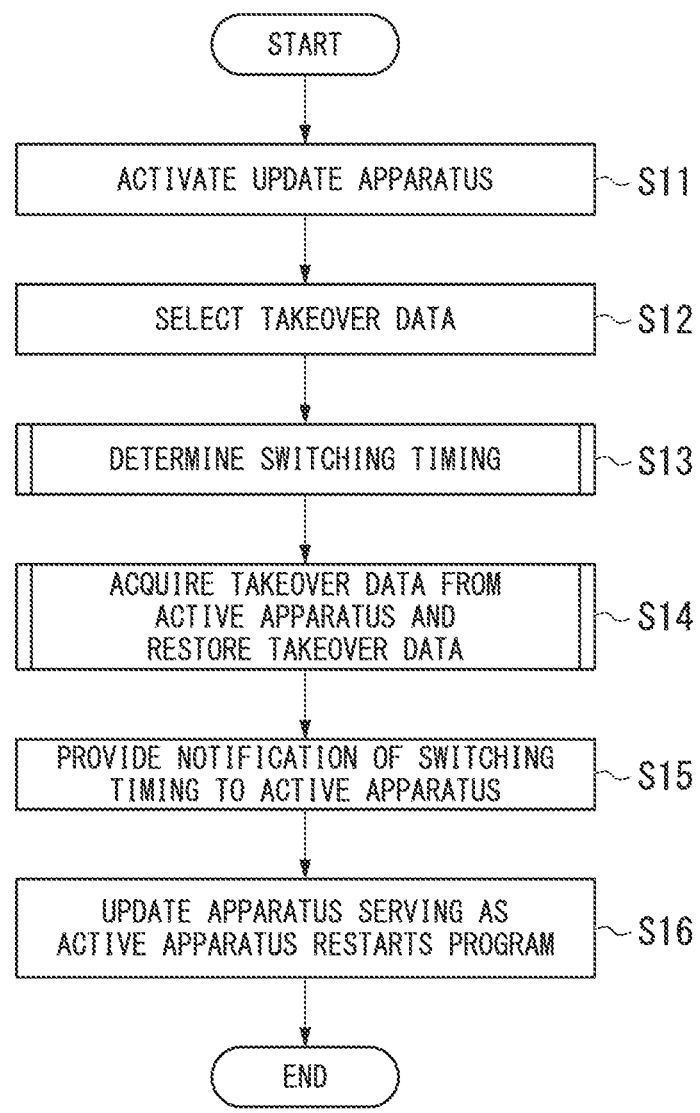
FIG. 3 is a flowchart showing a program update method according to the first embodiment of the present invention.

FIG. 3 is a flowchart showing a program update method according to the first embodiment of the present invention. Under the assumption that the steps of the flowchart shown in FIG. 3 is executed, the process control apparatus 10 (the active apparatus) is operating using the system program before the update. The process control apparatus 20 (the update apparatus) is on standby in a state in which the updated system program is installed. The system program after the update is downloaded from the engineering equipment 30 and installed, for example, when the process control apparatus 20 (the update apparatus) has been temporarily activated on the basis of the designation from the engineering equipment 30.

The system program in the process control apparatus 20 (the update apparatus) may be entirely updated or only a part thereof may be updated. The operation of the flowchart shown in FIG. 3 is started when the activation command output from the engineering equipment 30 is received by the communication manager 24a of the process control apparatus 20 (the update apparatus).

When the step shown in FIG. 3 is started, the process control apparatus 20 (update apparatus) that is on standby is first activated (step S11). Next, a step of selecting data (context) required to continue the execution of the system function being executed in the process control apparatus 10 (the active apparatus) is performed by the data takeover unit 24b of the process control apparatus 20 (the update apparatus) (step S12). For example, the data takeover unit 24b performs a step of selecting the above-described data with reference to the symbol table TB1 of the system function in the process control apparatus 10.

Figure 4:
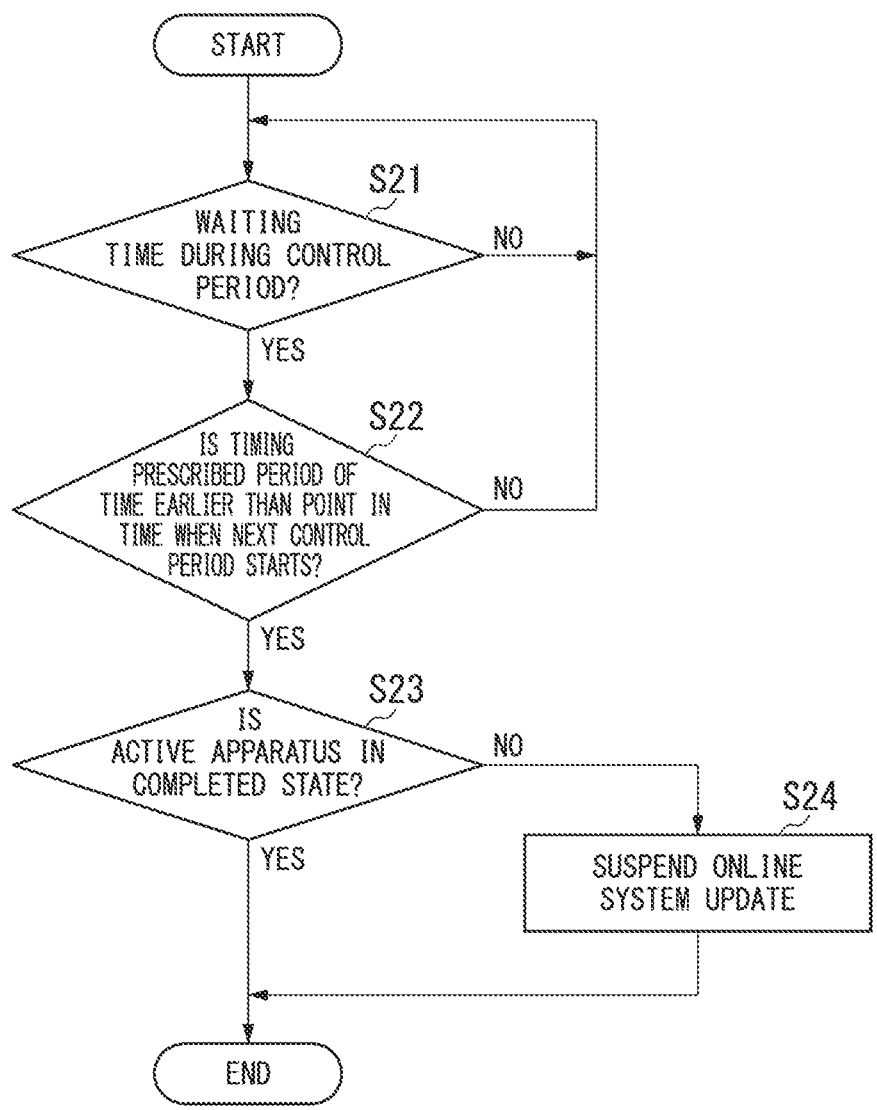
FIG. 4 is a flowchart showing details of step S13 in FIG. 3.

Subsequently, a step of determining a timing when the switching from the process control apparatus 10 (the active apparatus) to the process control apparatus 20 (the update apparatus) will be performed is performed by the timing determiner 24c of the process control apparatus 20 (the update apparatus) (step S13: timing determination step). FIG. 4 is a flowchart showing the details of step S13 in FIG. 3.

When step S13 is started, the timing determiner 24c first performs a step of determining whether or not the current time is a waiting time during a control period (i.e., whether or not the current time is between the end of a processing to be executed in a certain control period of the process control apparatus 10 and the start of the next control period) (step S21). When the determination result in step S21 is "NO," the determination in step S21 is iterated. That is, because a certain control period is in progress in the process control apparatus 10 (the active apparatus), a step of waiting until the control period ends is performed.

On the other hand, when the determination result in step S21 is "YES," the timing determiner 24c performs a step of determining whether or not a timing is a prescribed period of time earlier than a point in time when the next control period starts (step S22). The above-described prescribed period of time is a sum of a period of time required for the timing determiner 24c to confirm the completed state of the process control apparatus 10 and a period of time required for the data takeover unit 24b to acquire the takeover data DT from the process control apparatus 10 and restore the takeover data DT in the process control apparatus 20.

When the determination result in step S22 is "NO," the flow returns to step S21. On the other hand, when the determination result in step S22 is "YES," the timing determiner 24c performs a step of determining whether or not the process control apparatus 10 (the active apparatus) is in the completed state (step S23). When the determination result in step S23 is "NO," the timing determiner 24c performs a mechanism of suspending the online system update. When this is performed, the series of steps shown in FIG. 3 ends. On the other hand, when the determination result in step S23 is "YES," it is assumed that the switching timing has been reached and step S13 shown in FIG. 3 is completed.

Figure 5:
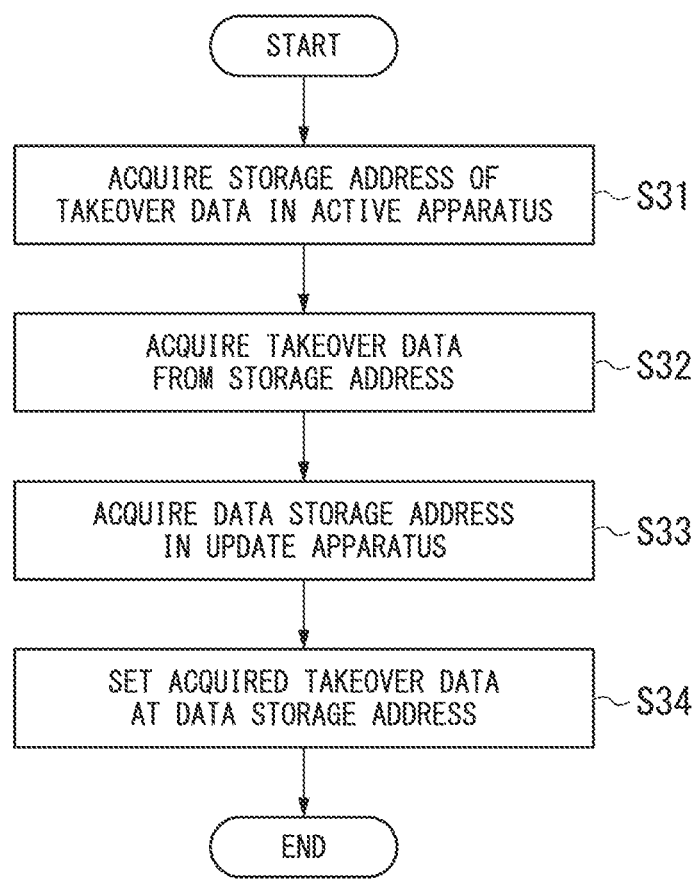
FIG. 5 is a flowchart showing details of step S14 in FIG. 3.

When step S13 shown in FIG. 3 is completed, the data takeover unit 24b is called from the timing determiner 24c. A step of acquiring the takeover data DT from the process control apparatus 10 (the active apparatus) and restoring the takeover data DT in the process control apparatus 20 (the update apparatus) is performed by the data takeover unit 24b (step S14: data takeover step). FIG. 5 is a flowchart showing details of step S14 in FIG. 3.

When step S14 is started, the data takeover unit 24b first performs a step of acquiring an address where the takeover data DT is stored in the process control apparatus 10 (the active apparatus) with reference to the symbol table TB1 (step S31). For example, a step of acquiring addresses where all takeover data DT is stored at once is performed. Next, the data takeover unit 24b performs a step of acquiring the takeover data DT stored at the address acquired in step S31 from the process control apparatus 10 (the active apparatus) using the memory accessors 15a and 25a (step S32).

Next, in the process control apparatus 20 (the update apparatus), a step of acquiring an address where the takeover data DT should be stored is performed by the data takeover unit 24b (step S33). Specifically, a step of acquiring an address of a variable for use in the system program after the update installed in the process control apparatus 20 (the update apparatus) is performed. Subsequently, the data takeover unit 24b performs a step of setting the takeover data DT acquired from the process control apparatus 10 (the active apparatus) in step S32 at the address of the process control apparatus 20 (the update apparatus) acquired in step S33. By performing the above steps, the takeover data DT is restored in the process control apparatus 20 (the update apparatus).

When the above steps are completed, the timing determiner 24c performs a step of notifying the process control apparatus 10 (the active apparatus) of a switching timing (step S15). When this notification is provided, the program restarter 24d waits for a control signal (control right) to be transmitted from the process control apparatus 10 via the redundancy functions 15 and 25.

When the above-mentioned switching timing provided in a notification by the timing determiner 24c is received, the process control apparatus 10 (the active apparatus) transmits the control signal (the control right) to the process control apparatus 20 (the update apparatus) via the redundancy functions 15 and 25 and then stops the operation. When the control signal (the control right) transmitted from the process control apparatus 10 is received, the program restarter 24d performs a step of restarting a program that implements the system function and causing the process control apparatus 20 to operate as the active apparatus (step S16).

As described above, in the present embodiment, the process control apparatus 20 that is the update apparatus acquires takeover data DT, which is required to be taken over so that a system function is continued, from the process control apparatus 10 that is the active apparatus when switching from the process control apparatus 10 to the process control apparatus 20 is performed, restores the takeover data DT in the process control apparatus 20, and determines a timing when the switching from the process control apparatus 10 to the process control apparatus 20 will be performed. In this manner, in the present embodiment, it is only necessary to embed a function of extending the online update function required for extending the online system update into the process control apparatus 20 that is the update apparatus and it is unnecessary to embed the function of extending the online update function into the process control apparatus 10 that is the active apparatus. Thus, it is possible to implement the function extension of the online system update without stopping the process control system 1.

Second Embodiment

<Process Control System>

Figure 6:
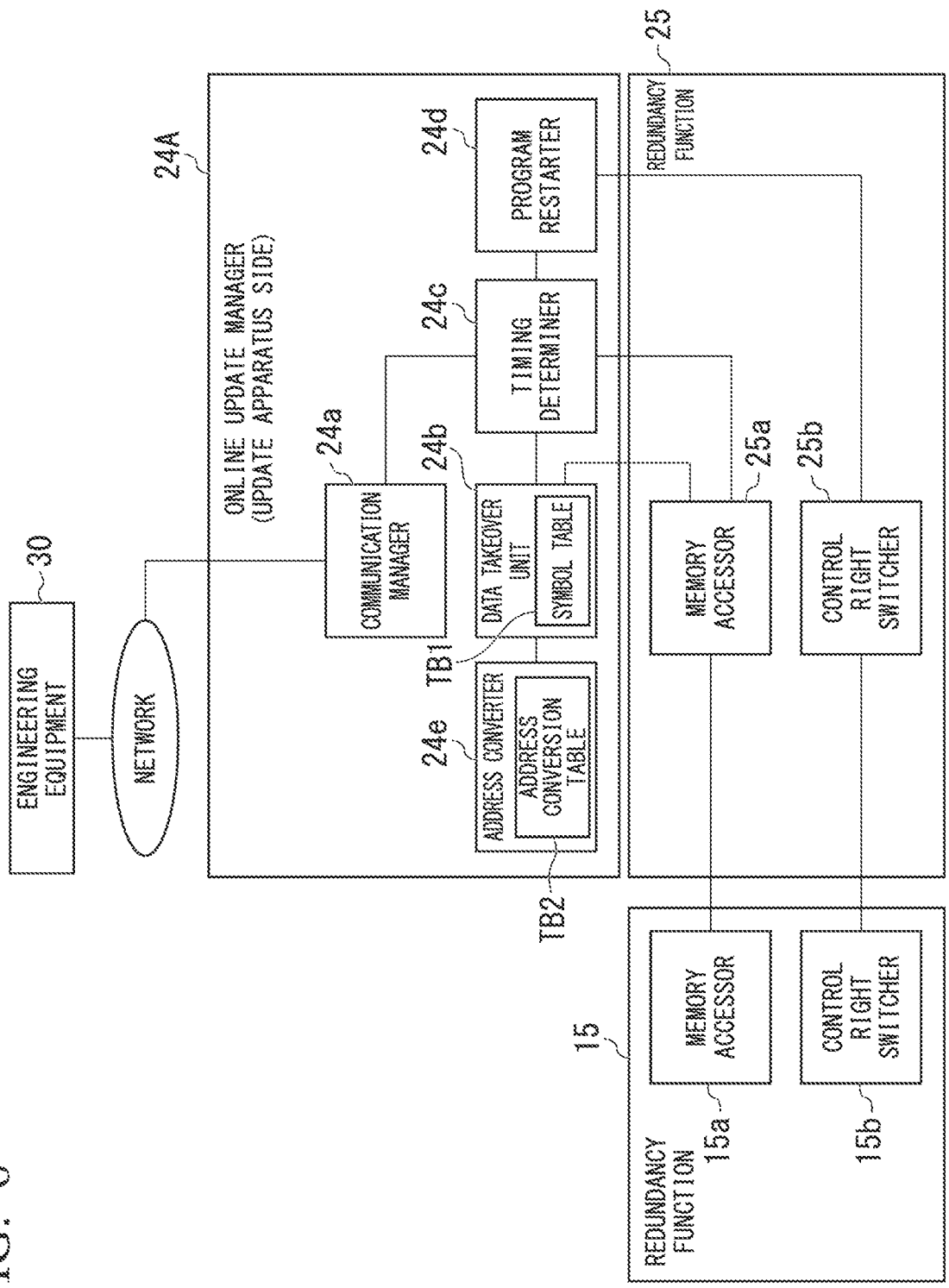
FIG. 6 is a functional block diagram showing a functional configuration in which online system update is implemented in a second embodiment of the present invention.

FIG. 6 is a functional block diagram showing a functional configuration in which online system update is implemented in the second embodiment of the present invention. In FIG. 6, the same reference signs are given to the components corresponding to those shown in FIG. 2. The functional configuration of the entire process control system according to the present embodiment is similar to that described with reference to FIG. 1. Hereinafter, differences from the first embodiment described above will be mainly described.

In the present embodiment, even if a value of takeover data DT is an address value of a variable stored in an address change area, the takeover data DT is correctly taken over. The address change area is an area (a storage area) where an address may change when switching from a process control apparatus 10 (an active apparatus) to a process control apparatus 20 (an update apparatus) is performed. This address change area includes one or more areas where addresses are continuous and each area is managed according to a start address and a size thereof.

Even if the address value of the variable stored in such an address change area is taken over, the address value that has been taken over becomes meaningless if the start address of the address change area is changed. In the present embodiment, even if the start address of the address change area changes, the takeover data DT is taken over correctly.

As shown in FIG. 6, an online update manager 24A in the present embodiment has a configuration in which an address converter 24e is added to the online update manager 24 shown in FIG. 2. Redundancy functions 15 and 25 are the same as those shown in FIG. 2. When a value of the takeover data DT is the address value of the variable stored in the address change area, the address converter 24e is called from the data takeover unit 24b and converts the address value using the address conversion table TB2. If the value of the takeover data DT is not the address value of the variable stored in the address change area, the address converter 24e does not perform conversion using the address conversion table TB2.

The address conversion table TB2 is a table in which storage addresses before the switching is performed and storage addresses after the switching is performed are associated with all variables stored in the address change area. The address conversion table TB2 is provided for each area where the addresses of the address change area are continuous (i.e., for each area managed according to the start address and the size thereof).

This address conversion table TB2 utilizes the property that the offset of the storage address of each variable (the offset from the start address of the address change area) does not change between before and after switching unless a program related to the address change area is modified. The address conversion table TB2 is created in advance using, for example, a symbol table generated by compiling and linking a system program (a source program) that implements the system functions in the process control apparatuses 10 and 20.

FIG. 7A is a diagram showing an example of an address conversion table according to the second embodiment of the present invention. FIG. 7B is a diagram showing an example of external variables. The address conversion table TB2 shown in FIG. 7A is related to a case where external variables shown in FIG. 7B are declared in a system program (a source program) that implements a system function in the process control apparatus 10. In the present embodiment, the above source program is described as being written in C language for easy understanding, but the above source program may be written in any language other than C language.

In the example shown in FIG. 7B, an integer type variable a, a structure variable b having integer type variables b1 and b2 as members, an array variable c having six integer type elements, a pointer *p_a for the variable a, a pointer *p_b for the member b2 of the structure variable b, and a pointer *p_c for the $2^{nd}$ element (c[2]) of the array variable c are declared as external variables. When such declaration is made, the variable a, the structure variable b, the member b1 of the structure variable b, the member b2 of the structure variable b, the array variable c, the $0^{th}$ to $5^{th}$ elements c[0] to c[5] of the array variable, a pointer variable p_a, a pointer variable p_b, and a pointer variable p_c are continuously stored in the address change area in that order as shown in FIG. 7A. A size of each variable is 32 bits (4 bytes).

Assuming that the start address of the address change area before switching where these external variables are stored is "0xa000" in hexadecimal notation, an address where each external variable is stored is an "address before switching" as shown in FIG. 7A. Assuming that the start address of the address change area after switching where these external variables are stored is 0xc000 in hexadecimal notation, the address where each external variable is stored is "address after switching" as shown in FIG. 7A. The size of the address change area where the external variable is stored is 48 bytes and does not change between before and after switching.

<Program Update Method>

The program update method of the present embodiment is similar to the program update method of the first embodiment and the system program is basically updated by executing the steps shown in FIGS. 3 to 5. However, in the present embodiment, when the step of acquiring and restoring the takeover data DT from the active apparatus (step S14 shown in FIG. 3) is performed by the data takeover unit 24b, a conversion procedure using the address conversion table TB2 is performed by the address converter 24e.

Figure 8:
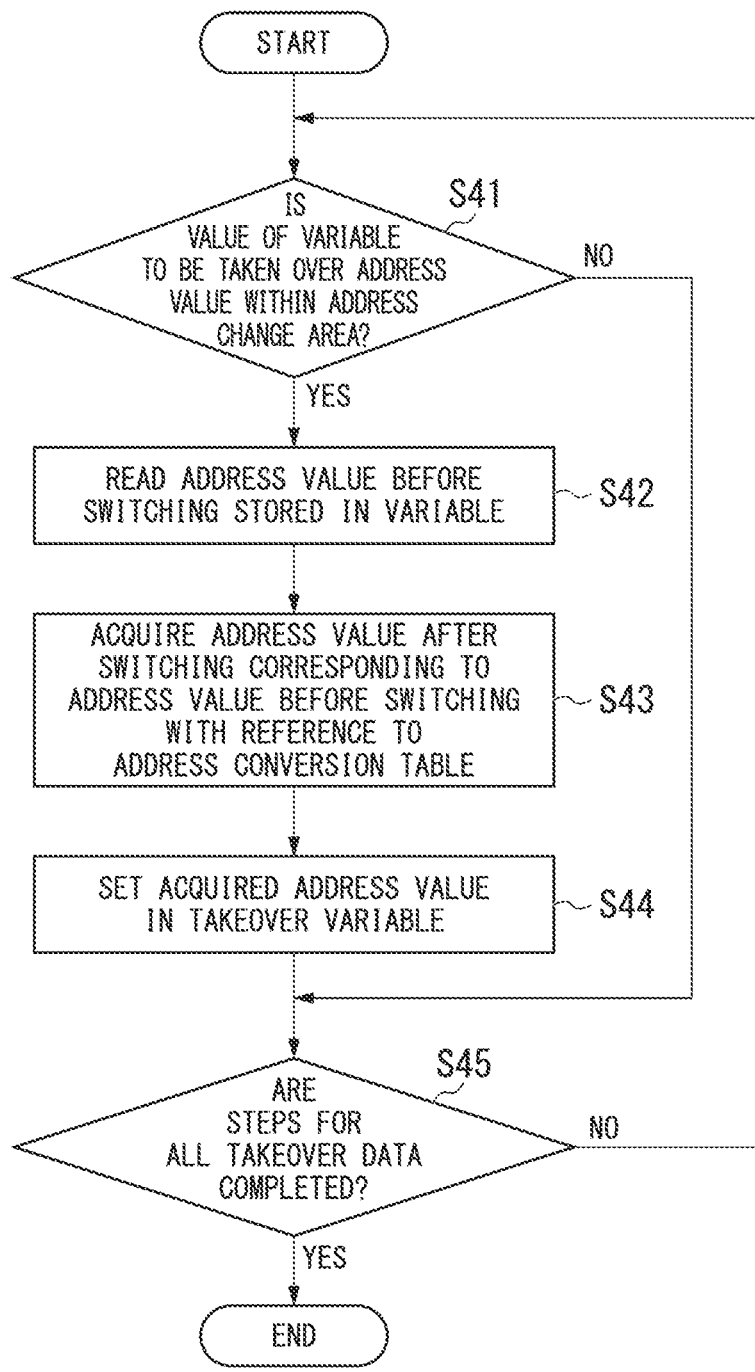
FIG. 8 is a flowchart showing an address conversion procedure performed in the second embodiment of the present invention.

FIG. 8 is a flowchart showing an address conversion procedure performed in the second embodiment of the present invention. The steps of the flowchart shown in FIG. 8 may be performed, for example, in step S32 or step S34 in FIG. 5 showing step S14 shown in FIG. 3 in detail. When the process is started, the data takeover unit 24b first determines whether or not a value of the variable to be taken over is an address value within the address change area (step S41).

When the determination result in step S41 is "YES," the data takeover unit 24b performs a step of extracting an address value before switching stored in the variable to be taken over (step S42). Subsequently, the address converter 24e is called by the data takeover unit 24b and the address converter 24e performs a step of acquiring an address value after switching corresponding to an address value before switching with reference to the address conversion table TB2 (step S43). Subsequently, the address converter 24e performs a step of setting the acquired address value in the variable to be taken over (step S44).

When step S44 is completed or when the determination result in step S41 is "NO," the data takeover unit 24b determines whether or not the above step is completed for all takeover data DT (step S45). When the determination result in step S45 is "NO," the flow returns to step S41 and a similar step is performed for the remaining variables. On the other hand, when the determination result in step S45 is "YES," the series of steps shown in FIG. 8 is completed.

If the above steps are performed when the external variables shown in FIG. 7B are declared, address values stored in the pointer variable p_a, the pointer variable p_b, and the pointer variable p_c in the example shown in FIG. 7B are converted. Specifically, an address value "0xa000" stored in the pointer variable p_a is converted into an address value "0xc000," an address value "0xa008" stored in the pointer variable p_b is converted into an address value "0xc008," and an address value "0xa014" stored in the pointer variable p_c is converted into an address value "0xc014." On the other hand, in relation to the remaining variables (the variable a, the structure variable b, the member b1 of the structure variable b, the member b2 of the structure variable b, the array variable c, and the $0^{th}$ to $5^{th}$ elements c[0] to c[5] of the array variable c), values thereof are taken over as they are.

As described above, in the present embodiment, when the takeover data DT is the address value of the variable stored in the address change area where the address is like to change between before and after switching, the address value is converted using the address conversion table TB2. Thus, even if the start address of the address change area changes between before and after switching, the takeover data DT (the address value of the variable stored in the address change area) can be correctly taken over.

In the present embodiment, when the variable assigned to the address change area is modified, this modification can be easily dealt with by modifying only the address conversion table TB2. Specifically, when a variable in the address change area is added or deleted, it is only necessary to modify the offset of the variable according to the addition or deletion.

FIG. 9A is a diagram showing an example of a modified address conversion table in the second embodiment of the present invention. FIG. 9B is a diagram showing another example of external variables. Now, it is assumed that external variables (variables assigned to the address change area) shown in FIG. 7B have been modified as shown in FIG. 9B. Specifically, it is assumed that the structure variable b having the integer type variables b1 and b2 as members has been modified to a structure variable b having the integer type variables b1, b2, b3, and b4 as members and the array variable c having the six integer type elements has been modified to an array variable c having four integer type elements.

When such modification has been made, it is only necessary to modify the address conversion table TB2 shown in FIG. 7A to the address conversion table TB2 shown in FIG. 9A. That is, it is only necessary to make modifications under the assumption that there are no addresses before switching for the added members b3 and b4 of the structure variable b and there are no addresses after switching for the deleted elements (the $4^{th}$ and $5^{th}$ elements) of the deleted array variable c.

In the above embodiment, the address converter 24e converts the address value to be taken over (the address value of the variable stored in the address change area) using the address conversion table TB2. However, if the offset address value from the beginning of the address change area does not change between before and after switching with respect to the storage address of each variable assigned within the area, i.e., if modification such as addition or deletion for the variable assigned to the address change area is absent, the address converter 24e may be configured to convert the address value to be taken over using the address conversion equation shown in the following Eq. (1) without using the address conversion table TB2.

$$D=C+(B-A) \quad (1)$$

A: Start address of address change area before switching
B: Start address of address change area after switching
C: Address value before switching
D: Address value after switching Third Embodiment <Process Control System>

Figure 10:
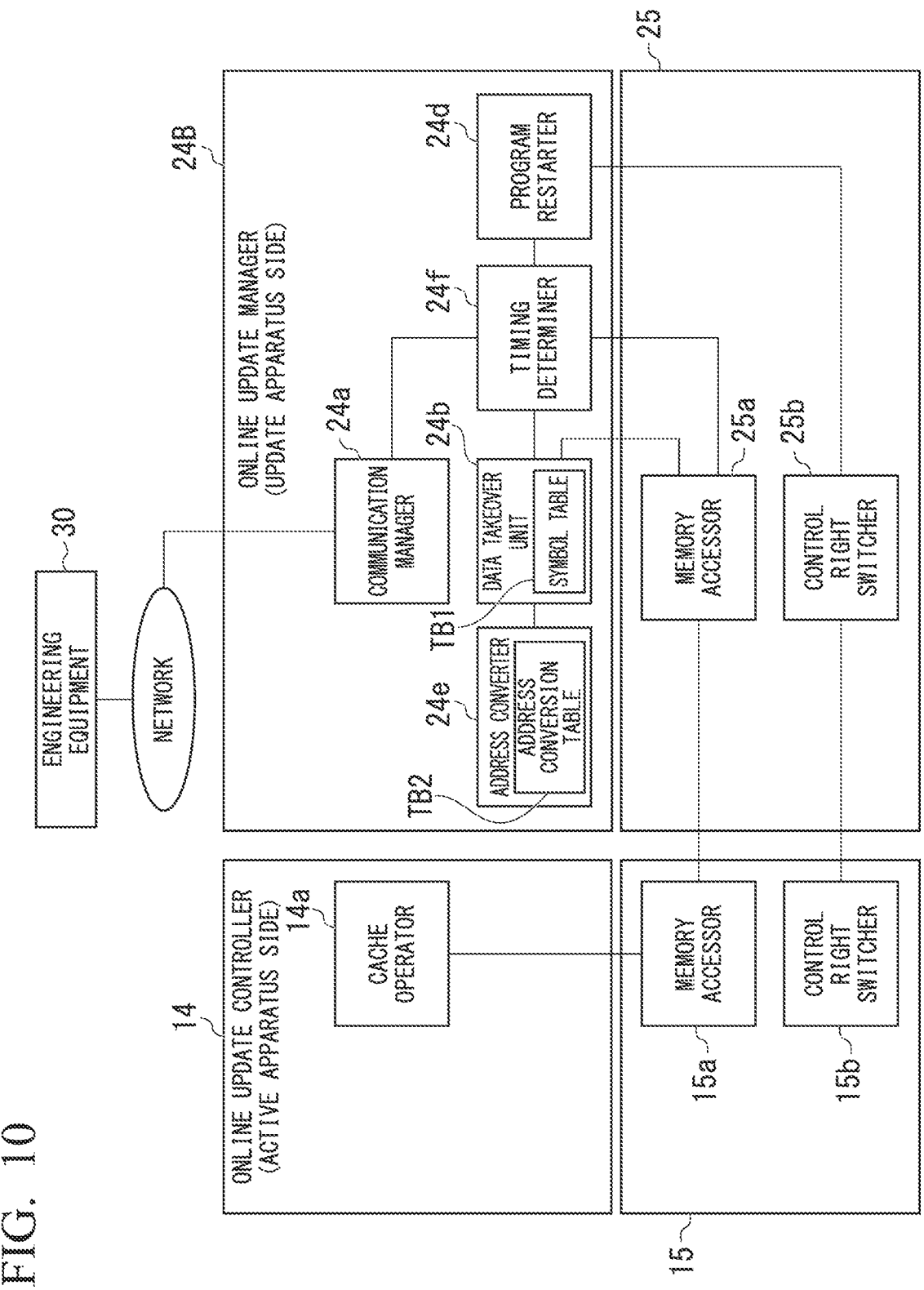
FIG. 10 is a functional block diagram showing a functional configuration in which online system update is implemented in a third embodiment of the present invention.

FIG. 10 is a functional block diagram showing a functional configuration in which online system update is implemented in the third embodiment of the present invention. In FIG. 10, the same reference signs are given to the components corresponding to those shown in FIGS. 2 and 6. The functional configuration of the entire process control system according to the present embodiment is similar to that described with reference to FIG. 1. Hereinafter, differences from the first and second embodiments described above will be mainly described.

In the present embodiment, even if a cache is enabled in a process control apparatus 10 (an active apparatus), takeover data DT is taken over correctly. The cache of the process control apparatus 10 (the active apparatus) is a temporary storage area of data provided between a CPU and a memory provided in the process control apparatus 10 (the active apparatus). Because the cache cannot be referred to from a process control apparatus 20 (an update apparatus), it can be said that data is temporarily retained in a state in which the data cannot be referred to from the process control apparatus 20 (the update apparatus).

When such a cache is provided, content may be different between the data stored in the cache and the data stored in the memory. Because the process control apparatus 20 (the update apparatus) accesses the memory of the process control apparatus 10 (the active apparatus) to acquire the takeover data DT, the takeover data DT is not taken over correctly when the data stored in the memory is different from the data stored in the cache. In the present embodiment, the takeover data DT is correctly taken over by operating the cache of the process control apparatus 10 (the active apparatus) from the process control apparatus 20 (the update apparatus).

As shown in FIG. 10, in the present embodiment, an online update manager 14 is provided on the active apparatus side (the process control apparatus 10 in FIG. 1). An online update manager 24B is provided on the update apparatus side (the process control apparatus 20 in FIG. 1). Redundancy functions 15 and 25 are the same as those shown in FIGS. 2 and 6.

The online update manager 14 controls an online system update mechanism of updating a system program while continuing an execution of a system function implemented by the system program together with the online update manager 24B. The online update manager 14 includes a cache operator 14a that operates the cache of the process control apparatus 10 (the active apparatus). In the present embodiment, it is necessary to embed the online update manager 14 including the cache operator 14a into the process control apparatus 10 (the active apparatus) in advance.

Specifically, the cache operator 14a operates the cache according to the following three types of cache operation flags.

Flash flag . . . This flag is used to control whether or not to reflect content of the cache in a memory. If a value of the flag is "1," the cache operator 14a reflects the content of the cache in the memory. When the content of the cache is reflected in the memory, the value is set to "0" by the cache operator 14a.

Disable flag . . . This flag is used to disable the cache. If a value of the flag is "1," the cache is disabled by the cache operator 14a.

Enable flag . . . This flag is used to enable the cache. If a value of the flag is "1," the cache is enabled by the cache operator 14a.

The online update manager 24B has a configuration in which the timing determiner 24c of the online update manager 24A shown in FIG. 6 is replaced with a timing determiner 24f. The timing determiner 24f operates the cache of the process control apparatus 10 (the active apparatus) by changing the value of the cache operation flag for use in the cache operator 14a of the process control apparatus 10 (the active apparatus).

For example, the timing determiner 24f sets the value of the flash flag to "1" immediately before the determination of a switching timing after the end of a processing to be executed in a certain control period. The timing determiner 24f sets the value of the flash flag to "1" immediately after the execution of each system function executed by the process control apparatus 10 (the active apparatus) is completed. Alternatively, the timing determiner 24f sets the value of the disable flag to "1" during any period (for example, a period during which online system update is performed).

<Program Update Method>

The program update method of the present embodiment is similar to the program update method of the second embodiment and the system program is basically updated by executing the steps shown in FIGS. 3 to 5 and 8. However, in the present embodiment, the timing determiner 24f of the process control apparatus 20 (the update apparatus) sets the flash flag value to "1" between step S22 and step S23 shown in FIG. 4.

When the value of the flash flag is set to "1," the cache operator 14a of the process control apparatus 10 (the active apparatus) performs an operation of reflecting the content of the cache in the memory. By reflecting the content of the cache in the memory, the process control apparatus 20 (the update apparatus) can refer to the content. Thus, it can be said that the operation of reflecting the content of the cache in the memory performed by the cache operator 14a is an operation of enabling the data retained by the cache to be referred to from the process control apparatus 20 (the update apparatus).

As described above, in the present embodiment, the timing determiner 24f of the process control apparatus 20

(the update apparatus) operates the value of the cache operation flag and performs an operation of causing the cache operator 14a of the process control apparatus 10 (the active apparatus) to reflect the content of the cache in the memory. Thus, even if the cache is enabled in the process control apparatus 10 (the active apparatus), the takeover data DT can be taken over correctly.

In this manner, by using any of the above-described embodiments, it is possible to implement the online system update without stopping the process control system (a step of updating the system program while continuing the execution of the function (the system function) implemented by the system program).

At least some functions of the process control apparatuses 10 and 20 and the engineering equipment 30 according to the embodiments may be configured to be implemented in a computer. In this case, the functions of the process control apparatuses 10 and 20 and the engineering equipment 30 may be implemented by recording a program for implementing the functions on a computer-readable recording medium and causing a computer system to read and execute the program recorded on the recording medium.

The "computer system" described here is assumed to include an OS and hardware such as peripheral devices. The "computer-readable recording medium" refers to a flexible disk, a magneto-optical disc, a read-only memory (ROM), a portable medium such as a compact disc (CD)-ROM, a digital versatile disc (DVD)-ROM, or a universal serial bus (USB) memory, or a storage device such as a hard disk embedded in the computer system. Further, the "computer-readable recording medium" may include a computer-readable recording medium for dynamically retaining the program for a short period of time as in a communication line when the program is transmitted via a network such as the Internet or a communication circuit such as a telephone circuit and a computer-readable recording medium for retaining the program for a given period of time as in a volatile memory inside the computer system including a server and a client when the program is transmitted.

The above-described program may be a program for implementing some of the above-described functions. Further, the above-described program may be a program capable of implementing the above-described function in combination with a program already recorded on the computer system.

The process control system, the process control apparatus, and the program update method according to the embodiments of the present invention have been described above. The present invention is not limited to the above-described embodiments and can be arbitrarily modified within the scope of the present invention. For example, the first embodiment and the third embodiment may be combined. In the above-described embodiments, the configurations of the process control system and the process control apparatus have been described. However, the configurations provided in these embodiments can also be applied to any other system. In the above-described embodiment, the operating system may be a built-in OS for controlling a built-in system or may be a general-purpose OS for controlling a general-purpose computer.

What is claimed is:

1. A program update method for use in a process control system comprising a first process control apparatus which does not include an online update manager of a system program and a second process control apparatus which includes the online update manager, the program update method comprising:

acquiring, by the online update manager of the second process control apparatus, takeover data, which is data required to be taken over so that a system function is continued, from the first process control apparatus when switching from the first process control apparatus to the second process control apparatus is performed and restoring the takeover data in the second process control apparatus; and determining, by the online update manager of the second process control apparatus, a timing when the switching will be performed, wherein when a function extension of an online update function of the process control system is performed, an extension function is embedded into the online update manager of the second process control apparatus, and the extension function is not embedded into the first process control apparatus.

2. A process control system, comprising:

a first process control apparatus which does not include an online update manager of a system program, and comprises a first memory; and a first processor connected to the first memory; and a second process control apparatus which includes the online update manager, and comprises a second memory; and a second processor connected to the second memory, wherein the second processor is configured to make the online update manager of the second process control apparatus:

acquire, from the first process control apparatus, takeover data which is required to be taken over to continue a system function, when switching from the first process control apparatus to the second process control apparatus is performed;

restore the takeover data in the second process control apparatus; and determine a timing when the switching will be performed, and wherein when a function extension of an online update function of the process control system is performed, an extension function is embedded into the online update manager of the second process control apparatus, and the extension function is not embedded into the first process control apparatus.

3. The process control system according to claim 2, wherein the second processor is configured to acquire the takeover data from the first process control apparatus with reference to a symbol table of the system function in the first process control apparatus.

4. The process control system according to claim 2, wherein the second processor is configured to determine the timing to perform the switching after confirming a completed state in which executions of all system functions in the first process control apparatus are completed.

5. The process control system according to claim 4, wherein the second processor is configured to suspend the switching when the completed state cannot be confirmed.

6. The process control system according to claim 2, wherein the second processor is configured to convert an address value serving as the takeover data using an address conversion table in which an address of a variable stored in an address change area before the switching is performed is associated with an address of the variable stored in the address change area after the switching is performed when the takeover data is the address value of the variable stored in the address change area where the address is changeable.

7. The process control system according to claim 6, wherein the address conversion table is generated in advance using a symbol table of the system function in the first process control apparatus and a symbol table of the system function in the second process control apparatus.

8. The process control system according to claim 2,
wherein the first processor is configured to operate a cache that temporarily retains data to be used internally in a state in which it is difficult to refer to the data from the second process control apparatus, and
wherein the second processor is configured to perform an operation of enabling the data retained by the cache to be referred to from the second process control apparatus with respect to the first processor when the timing is determined.

9. The process control system according to claim 8, wherein the second processor is configured to perform an operation of enabling or disabling the cache with respect to the first process control apparatus.

10. The process control system according to claim 3, wherein the symbol table is generated by compiling and linking a system program that implements the system function in the first process control apparatus.

11. The process control system according to claim 3, wherein the second processor is configured to acquire an address where the takeover data is stored in the first process control apparatus by referring to the symbol table.

12. The process control system according to claim 2, wherein the timing is between an end of a process to be executed in a certain control period of the first process control apparatus and a start of a next control period and is a timing that is a prescribed period of time earlier than a point in time when the next control period starts.

13. The process control system according to claim 12, wherein the prescribed period of time is a sum of a period of time required to confirm a completed state of the first process control apparatus and a period of time required to acquire the takeover data from the first process control apparatus and restore the takeover data in the second process control apparatus.

14. The process control system according to claim 6, wherein the address change area includes one or more areas where addresses are continuous and each area is managed according to a start address and a size thereof.

15. A process control apparatus in which switching from another process control apparatus which does not include an online update manager of a system program is performed, the process control apparatus including the online update manager, the online update manager of the process control apparatus comprising:
a memory; and
a processor connected to the memory, the processor being configured to:
acquire, from the another apparatus, takeover data which is required to be taken over from the another apparatus to continue a system function when the switching is performed and restore the takeover data in the process control apparatus; and
determine a timing when the switching will be performed, wherein
when a function extension of an online update function of a process control system is performed, an extension function is embedded into the online update manager of the process control apparatus, and the extension function is not embedded into the another process control apparatus.

* * * * *